May 11, 1926.

A. J. GERRARD ET AL 1,584,221

METHOD OF AND APPARATUS FOR MAKING TIN PLATE

Filed March 31, 1924   3 Sheets-Sheet 1

Inventors
A.J.Gerrard
P.Wright
S.Peacock
by J. A. Witherspoon
Attorney

May 11, 1926.　　　　　　　　　　　　　　　　　　　1,584,221
　　　　　　　　A. J. GERRARD ET AL
　　　METHOD OF AND APPARATUS FOR MAKING TIN PLATE
　　　　　　Filed March 31, 1924　　　3 Sheets-Sheet 2
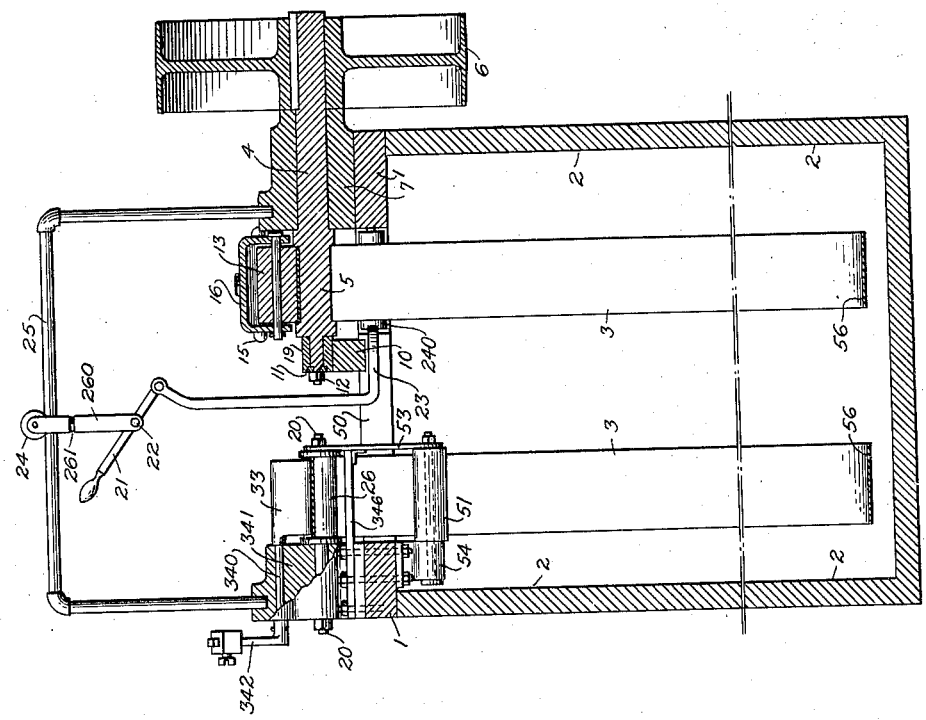
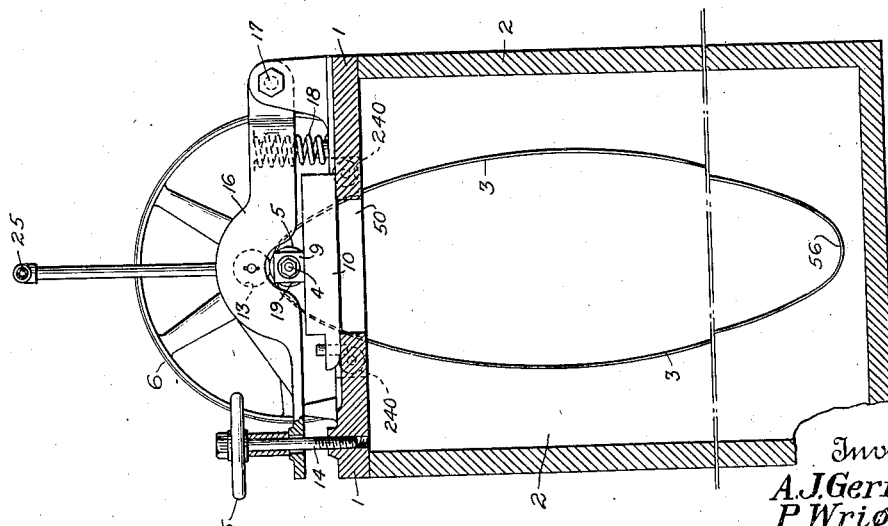
Inventors
A. J. Gerrard
P. Wright
S. Peacock
by J. A. Witherspoon
　　　Attorney

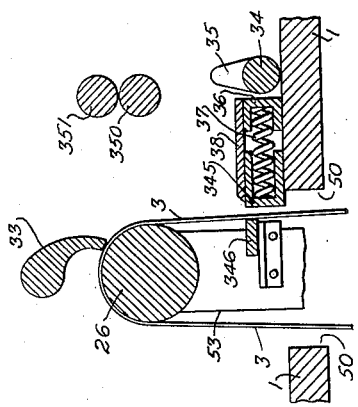
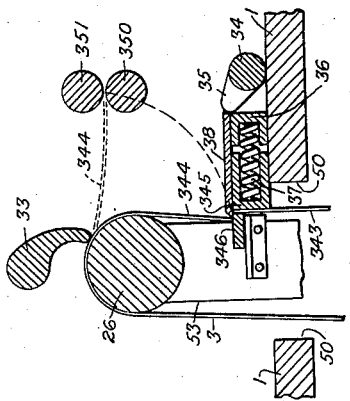
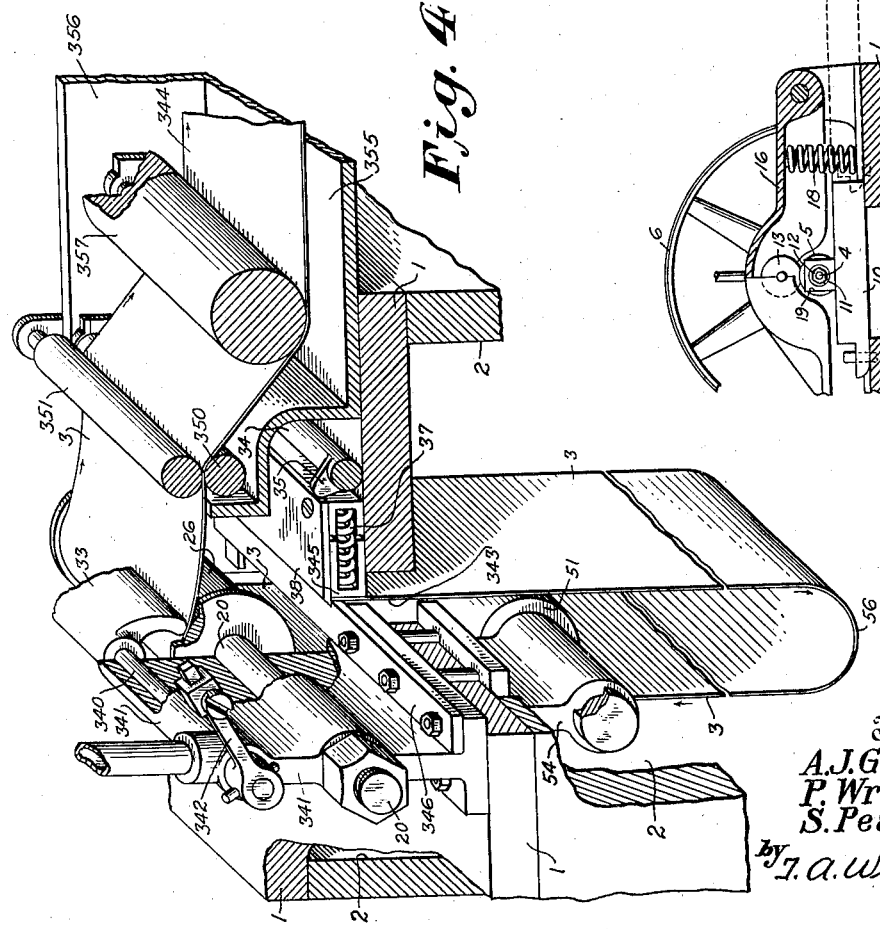

Patented May 11, 1926.

1,584,221

UNITED STATES PATENT OFFICE.

ALEC J. GERRARD AND PARVIN WRIGHT, OF CHICAGO, ILLINOIS, AND SAMUEL PEACOCK, OF WHEELING, WEST VIRGINIA; SAID WRIGHT AND SAID PEACOCK ASSIGNORS TO SAID GERRARD.

METHOD OF AND APPARATUS FOR MAKING TIN PLATE.

Application filed March 31, 1924. Serial No. 703,166.

Our invention relates to a machine for making sheet steel or the so-called tin plate, in lengths suitable to put up in rolls instead of cutting them into squares for boxing or shipping.

The numerous handlings and wastage in the present method of making tin plate incurs considerable expense and time, which heretofore has been apparently unavoidable.

With our new method of making tin plate on the other hand, we first make steel sleeves by any well known and suitable means and of a length corresponding to the width of the sheet or strip desired. These sleeves are not illustrated in the drawings, but they are made true and smooth, and one of them is then placed into the machine, which is caused to rotate quite rapidly, and at the same time the rollers 5 and 13 are forced together. It results that at once the sleeve begins to enlarge and heats up and the metal becomes thinner as the rolling process continues. When the thickness of ordinary tin plate has been attained, the sleeve will have lengthened out to several feet. The sides of the sheet remain true, smooth and parallel, and the band 3 thus formed is then taken off the rolls and placed on a stationary support or roll 26 preparatory to tinning and coiling on a spool or drum 361. While this is being done another sleeve is placed into the machine for making another sheet, all as will appear more fully hereinafter.

Referring to the accompanying drawings forming a part of this specification:—

Figure 2 is a sectional view taken on the line 2—2 of Fig. 1, looking in the direction of the arrows;

Figure 3 is a sectional view taken on the line 3—3 of Fig. 1, looking in the direction of the arrows;

Figure 4 is a sectional perspective view of a portion of the parts shown in Fig. 1;

Figure 5 is a sectional detail view of a portion of the compressing mechanism;

Figure 6 is a sectional detail view of a portion of the cutting mechanism; and

Figure 7 is a view similar to Fig. 6, showing the parts in a different position.

Figure 1:
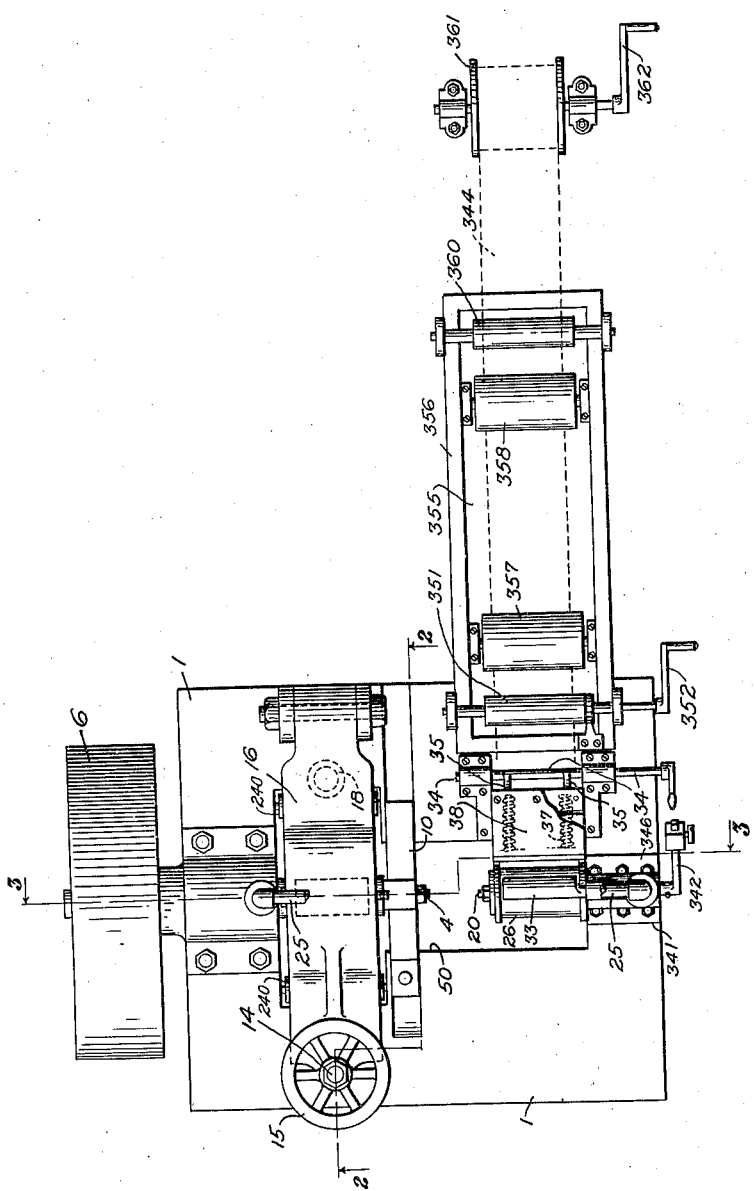
Figure 1 is a top plan view of a machine made in accordance with this invention.

1 indicates the base of the machine which rests over a well, hole or pit 2, into which the lengthening band 3 extends. 4 indicates a shaft carrying the lower deforming roll 5, on one end, and the drive pulley 6, on the other end. Said shaft 4 is supported near its middle by the bearing 7, and the roll 5 is so formed or recessed as to securely hold and guide the band 3, as shown. The end of shaft 4 near roll 5 is provided with a boxing 9, which rests on a sliding support 10, so that it will resist the downward pressure of roller 13, during the rolling operation, and said roll 5 is secured so that it cannot come off while working, by washer 11 and bolt 12. Slide bar support 10 moves back and forth to the right and left as seen in Fig. 2 so as to not obstruct the end of the roller while putting on and taking off the sleeve which is to be rolled into band 3. But during the rolling operation, the bar 10 should be positioned as indicated in said Fig. 2 so that it will support the end of shaft 4 and boxing 9. The roller 13 is carried by a hinged frame 16 pivoted at 17, and provided with a spring 18 to counteract the weight and to raise the roller 13 clear of the rolled sheet when the screw pressure is released. Said roller 13 is forced down upon the band 3 and roller 5 by means of the screw 14 and wheel 15 acting upon said hinged frame 16, and thus may be produced any desired pressure on said band 3. As the tin plate or band 3 lengthens it reaches further into the well or hole 2, as indicated, and this well may be 25, 50, or 100 feet or more in depth owing to the length of the band desired. The object of the pit 2 is to confine the band and to retain the heat therein that is generated by the rolling process. After the sleeve, not shown, has been introduced over the roller 5 of the machine, and the rollers 13 and 5 brought together by the band wheel 15 and screw 14, a few rapid turns of the pulley 6 make it quite hot and the continued turning soon makes the band 3 red hot without the use of a furnace or other heating means.

After the sleeve has thus been made into an endless band 3 of the desired length, the slide bar 10 is moved back, clearing the end of shaft 4 and box 9. The said band while still hot is then removed from the roll by the following means to a short stub shaft 20 in line with shaft 4, that is provided with a roller 26 on which to support the band 3. That is to say, this transfer is accomplished by the use of a trolley lift as shown in Fig. 2. Or, in other words, the handle 21 of the lift is swung on the pivot 22, thus bringing the hook portion 23 carrying the roll 240 below the deforming roll 5, and in position to be raised under the band 3. Said band can then be lifted and pushed along on the trolley wheel 24 supported by the arm 25 until it is in position to be transferred to the pulley or roller 26. The band 3 is next lowered on to the pulley 26 without damage. The connection 260 between the pivot 22 and wheel 24 is provided with a universal joint 261 to facilitate the transfer of the band 3 just described. Another sleeve, not shown, is then placed on the roll 5 while the preceding band 3 is being cut preparatory to a tinning operation as will presently appear.

After the band 3 has been thus placed on pulley 26, it is automatically clamped by dog 33 pivoted as at 340, in the frame 341, and thus connected with the weighted counterbalancing arm 342, all as will be clear from Figs. 3 and 4. Said clamping member 33 thus secures one end 344 of the band 3 to pulley 26, see Fig. 7, while its other end 343, after said band is cut in two, is held by the spring-pressed clamping member 345 against the edge of the plate 346, all as will be clear from Figs. 4 and 7. This latter clamping action is conveniently accomplished by means of the shaft 34 carrying the lug or cam 35 which takes against the sliding member 36, which compresses the spring 37, and this latter forces the clamping member 345 against the severed end 343 and the latter against plate 346. A knife member 38 is secured to member 36 and slides therewith as best illustrated in Figs. 6 and 7.

To the right of the roller 26, as seen in Fig. 4, there are disposed a pair of feed rolls 350 and 351, the upper one of which, 351, is conveniently provided with a handle 352, or other turning means, by which said rolls may be turned and the severed end 344 fed along as indicated in Fig. 4, after it has been passed between said feed rolls. From the feed rolls 350 and 351 the severed end or strip 344 passes down to the bottom 355 of a tank 356 and under a pair of guide rolls 357 and 358, see Figs. 1 and 4. After leaving the guide roll 358, said severed end, strip or sheet 344, passes upwardly out of tank 356 and between a pair of guide rolls 360, only one of which appears in Fig. 1, and from said guide rolls 360 said strip or sheet passes to the winding drum 361 operated by any suitable means as the crank 362.

It will be observed that the base plate 1 is provided with a slot or opening 50, of a length sufficient to permit the above described manipulations of the strip or sheet 3, and that also below the roll 26 there is disposed a guide roll or pulley 51 as best shown in Figs. 3 and 4, which is conveniently supported by the member 53 from the short shaft 20, and by the member 54 from the base plate 1. The function of the roll 51 is to prevent injury to the hot and thin sheet, or band 3 as it passes over roll 26.

It will be understood that in the tank 356 there is placed a tinning material, such as molten tin, or a suitable solution of tin or other metal with which the sheet 344 is to be treated; and that as the sheet is continued to be pulled by the feed rolls 350 and 351 around the roll 26, the clamp 33 will loosen its grip to permit the sheet to pass. When, however, the lower loop 56 of the sheet rises and strikes the roll 51, the strain brought on the end 343 of the sheet will be sufficient to pull said end loose, and thus may the entire length of a hot sheet be passed through the coating tank 356 without handling the same and without damage to said sheet or strip 344.

It is obvious that motors, not shown, may be employed in operating the parts wherever desired.

The rollers 240 illustrated in dotted lines in Fig. 2, are for the purpose of holding the band 3 in its proper position and to prevent its being deflected therefrom through centrifugal or other forces during the travel of the same.

It will now be clear that in the operation of this invention, one may cast or otherwise provide a hollow steel sleeve, not shown, but having a length equal to the width of the sleeve or strip to be made; that he will true up the ends of this sleeve and will see that its surface is smooth and concentric with its axis; that he will slip this sleeve over the roller 5, and will set up on the screw 14 to cause the roller 13 to compress the walls of said sleeve between said rollers 5 and 13. The roll 5 is then rotated slowly by the pulley 6, and the sleeve heats up rapidly, while at the same time it is rolled out into the endless band 3.

As the band 3 gets thinner and thinner, the screw 14 is operated to adjust the roller 13 towards the roller 5, and this action is continued until the band 3 acquires the desired thinness, when the pulley 6 is stopped and the handle 21 operated to transfer the said band to the roller 26 by means of the hook member 23 and roller 240. The endless and hot band 3 having thus been hung on the roller 26, the clamp 33 holds said band in place, and the cutter 38 severs said band and converts it into a sheet or strip having the ends 343 and 344. The end 343 is clamped between the members 345 and 346, and the end 344 is passed between the feed rolls 350 and 351, under the guide rolls 357 and 358 in tank 356 and between the guide rolls 360 to the winding drum 361. The tank 356 contains a coating material such as molten tin, or a solution of a coating metal, and the coated sheets or strip is wound up preparatory to being cut into suitable lengths for the purpose in hand or for further treatment.

It is further obvious that instead of making thin sheet steel by the process just disclosed, one may by changing the shape of the compressing rolls 5 and 13, roll out other steel shapes. That is by providing a large washer shaped annulus having a thickness equal to the diameter of a desired mill rod, one may roll out an endless ring, round or square in cross section, which when cut would form mill rods. Even wire can be rolled out into endless rings and cut by this means, or if desired, by properly shaping the compressing rolls, endless wire bands of various widths and thicknesses can be produced and cut into suitable lengths.

In fact, almost any hollow steel shape whose cross section is a circle concentric with and of a predetermined dimension along its axis may be rolled out into an endless length of material which will retain said dimension as its width, and will have any desired thickness, according to the adjustment of the rolls 5 and 13. That is to say, as is well known steel under the above rolling operations will not elongate in a direction parallel to the axes of the deforming rolls but only in a direction at right angles to said axes.

What is claimed is:—

1. In a machine of the character described, the combination of a pair of deforming rolls adapted to receive a hollow steel sleeve between them; means to cause said rolls to subject said sleeve to a compressing and rolling action when placed between them; means to transfer the endless steel shape thus produced to another support; and means to cut said endless shape to form an elongated shape having free ends.

2. In a machine of the character described, the combination of a pair of deforming rolls adapted to receive a hollow steel sleeve between them; means to cause said rolls to subject said sleeve to a compressing and rolling action when placed between them; an enclosure to receive the hot endless shape thus produced as it elongates under the action of said rolls; means to transfer the endless steel shape thus produced to another support; and means to cut said endless shape to form an elongated shape having free ends.

3. In a machine for making a flat sheet or strip of steel of a predetermined width and thickness, the combination of a pair of deforming rolls adapted to receive between them a hollow steel sleeve having a length equal to said width; means to cause said rolls to subject said sleeve to a rolling and compressing action sufficient to raise the temperature of, and to convert said sleeve into an endless band having a thickness equal to said first named thickness; an enclosure to receive said endless band while the same is being formed and to preserve the generated heat therein; and means to sever said band to form the desired sheet or strip.

4. In a machine for making a flat sheet or strip of steel of a predetermined width and thickness, the combination of a pair of deforming rolls adapted to receive between them a hollow steel sleeve having a length equal to said width; means to cause said rolls to subject said sleeve to a rolling and compressing action sufficient to raise the temperature of, and to convert said sleeve into an endless band having a thickness equal to said first named thickness; an enclosure to receive said endless band while the same is being formed and to preserve the generated heat therein; means to transfer said endless band to a support; means to hold said band in position on said support; and means to sever said band to form the desired sheet or strip.

5. In a machine for making a flat sheet or strip of steel of a predetermined width and thickness, the combination of a pair of deforming rolls adapted to receive between them a hollow steel sleeve having a length equal to said width; means to cause said rolls to subject said sleeve to a rolling and compressing action sufficient to raise the temperature of, and to convert said sleeve into an endless band having a thickness equal to said first named thickness; an enclosure to receive said endless band while the same is being formed and to preserve the generated heat therein; and means to form said severed band into a coil.

6. In a machine provided with means for the plastic deformation of metals and having a pit for receiving the elongated product, the combination of means for enclosing and confining for the operation, the heat generated by the process.

7. In a machine provided with spinning rolls and a pit for spinning metal sleeves into elongated bands, the combination of means for removing the same from the spinning rolls and additional means for removing the same from the pit.

8. In a machine provided with rolls for spinning metal sleeves into elongated bands, means for removing said bands from the rolls, combined with means for cutting the band and coiling the metal strip into spool-like form.

In testimony whereof we affix our signatures.

ALEC J. GERRARD.
PARVIN WRIGHT.
SAMUEL PEACOCK.